US005276294A

United States Patent [19]

Jalbert

[11] Patent Number: 5,276,294

[45] Date of Patent: Jan. 4, 1994

[54] ELEVATOR BUTTON IMPROVED TO FUNCTION AS A LOCK

[75] Inventor: Vincent P. Jalbert, Middlebury, Conn.

[73] Assignee: Otis Elevator Company, Farmington, Conn.

[21] Appl. No.: 804,562

[22] Filed: Dec. 10, 1991

[51] Int. Cl.[5] ........................ B66B 3/00; G08B 1/08; H04B 1/59

[52] U.S. Cl. ........................ 187/121; 340/825.31; 340/825.06; 361/179; 361/181; 187/130

[58] Field of Search ........................ 340/825.6, 825.31; 187/104, 121, 130, 139; 361/71, 72, 172, 176, 192, 193, 179, 181; 235/382

[56] References Cited

U.S. PATENT DOCUMENTS

| | | | |
|---|---|---|---|
| 3,787,714 | 1/1974 | Reanick et al. | 361/172 |
| 4,016,490 | 4/1977 | Weckenmann et al. | 361/181 |
| 4,079,356 | 3/1978 | Anagnost et al. | 340/825.31 |
| 4,415,065 | 11/1983 | Sandstedt | 186/39 |
| 4,453,161 | 6/1984 | Lemelson | 340/825.31 |
| 4,497,391 | 2/1985 | Mendelsohn et al. | 187/121 |
| 4,509,093 | 4/1985 | Stellberger | 361/172 |
| 4,591,854 | 5/1986 | Robinson | 340/825.21 |
| 4,622,551 | 11/1986 | Kupersmith et al. | 340/825.06 |
| 4,655,324 | 4/1987 | Meguerdichian et al. | 187/121 |
| 4,723,121 | 2/1988 | Van Den Boom et al. | 340/825.31 |
| 4,831,279 | 5/1989 | Ingraham | 307/116 |
| 4,937,702 | 6/1990 | Kurihara | 361/179 |
| 4,979,594 | 12/1990 | Begle et al. | 187/121 |

*Primary Examiner*—Donald J. Yusko
*Assistant Examiner*—Edward Merz

[57] ABSTRACT

The invention prioritizes elevator service by an electronic lock and key circuit which uses a pre-existing capacitive touch button, an electronic key for receiving a 10 KHz first button pulse train from the face of the capacitive touch button and modulating said capacitive touch button pulse train with a signal of a preset frequency. A modulated first pulse train is provided back to the capacitive touch button face and an electronic lock for modulating a demodulated first pulse train received at the capacitive touch button face so as to provide a high priority hall call or a car call.

11 Claims, 3 Drawing Sheets

ELEVATOR BUTTON IMPROVED TO FUNCTION AS A LOCK

TECHNICAL FIELD

This invention relates to prioritizing of hall calls and car calls. The invention uses electronics already in use as part of a capacitive touch button as part of an electronic lock and key circuit.

BACKGROUND OF THE INVENTION

There are numerous electronic lock and key circuits available. U.S. Pat. No. 3,787,714, "Electronic Lock and Key Systems Employing Paired Key and Master Coding Modules", discloses a system for activating an electric latch when a valid key is inserted into a key receiving receptacle. The system is energized by the insertion of the key into the receiving receptacle to energize both the key and the master coding card to cause a correlation sequence to be implemented to determine whether information contained on the key is valid by comparing this information with the predetermined information on the master coding card.

U.S. Pat. No. 4,079,356, "Coded Electronic Lock and Key", discloses an electronic key comprising a first binary counter and a first multiplexer for pulse code modulating a uniform clock pulse train to produce a first coded pulse train modulated within a given code. The key is connected to an electronic lock comprising: (i) a second binary counter and a second multiplexer for pulse code modulating the same clock pulse train to produce a second coded pulse train modulated with the same code; (ii) an exclusive OR gate to which said first and second multiplexers are connected; (iii) a first NAND gate having one input connected to the output of the exclusive-OR gate; (iv) a flip-flop or binary counter having its clock input connected to the output of the NAND gate; (v) an initial logical one output connected to a second input of the NAND gate; (vi) a second NAND gate having one input connected to the output of the flip-flop or counter and another input connected to the output of the second multiplexer; and (vii) a binary counter having its clock input connected to the output of the second NAND gate. The output of the lock is taken from one of the counting outputs of the output counter.

Still further, U.S. Pat. No. 4,723,121, "Electronic Locking Apparatus for Motor Vehicles", discloses an electronic key and an electronic lock with each containing a synchronized, constantly operating, precision oscillator.

There is a need for allowing certain passengers entering car calls or hall calls to be serviced prior to other passengers. This need to "unlock" the elevator system for select persons and further provide them priority service is not met by any of these lock and key schemes.

SUMMARY OF THE INVENTION

It is an object of the present invention to prioritize elevator service by means of: (a) an electronic lock and key circuit which uses a pre-existing capacitive touch button; (b) an electronic key for (i) receiving a first button pulse train from the face of the capacitive touch button and (ii) modulating said capacitive touch button pulse train with a signal of a preset frequency, thereby providing a modulated first pulse train back to the capacitive touch button face; and (c) an electronic lock for demodulating a modulated first pulse train received at the capacitive touch button face so as to provide an unlock signal.

DETAILED DESCRIPTION OF THE INVENTION

Figure 1:
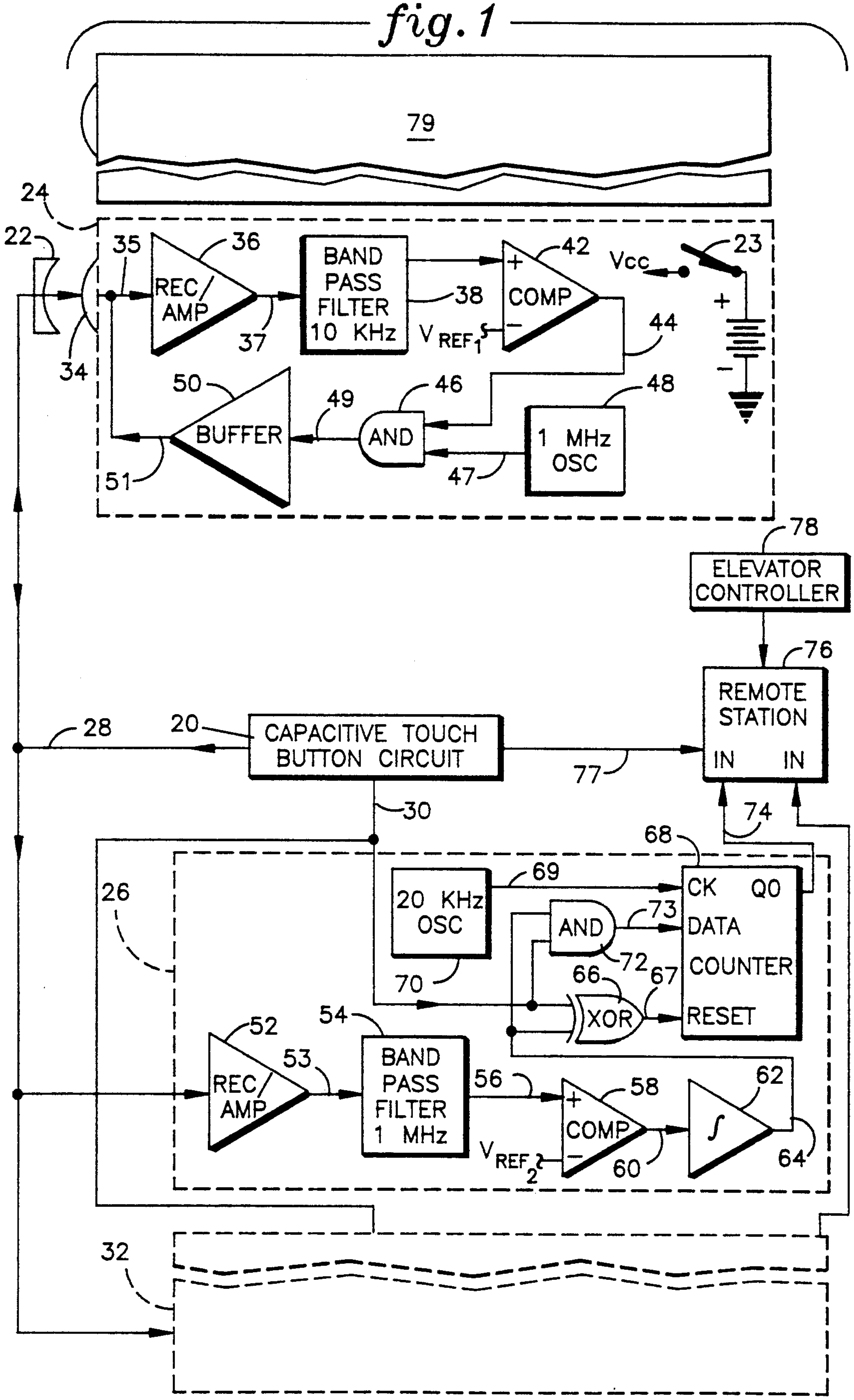
FIG. 1 is a block diagram of the circuit of the present invention.
Figure 2A:
FIGS. 2*a*–2*h* are signal diagrams associated with the capacitive touch button.
Figure 2B:
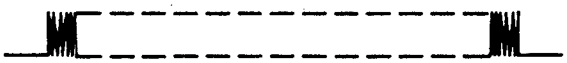
Figure 2C:
Figure 2D:
Figure 2E:
Figure 2F:
Figure 2G:
Figure 2H:

FIG. 1 shows the electronic lock and key system of the present invention including a capacitive touch button circuit 20, a capacitive touch button face 22, an electronic key 24, and an first electronic lock 26.

The capacitive touch button circuit 20 provides a 10 KHz first pulse train on a line 28 to the capacitive touch button face 22. The capacitive touch button circuit 20 also provides the 10 KHz first pulse train on a line 30 to the first electronic lock circuit 26, and to a second electronic lock circuit 32. When a passenger wishes to enter a hall call or car call using the electronic key 24, rather than touching the button, he touches the electronic key face 34 to the capacitive touch button 22, after activating a switch 23 to power the circuits of the electronic key 24.

At the electronic key 24, the electronic key face 34 touches the capacitive touch button face 22 and receives the 10 KHz first pulse train on a line 35 into a receiving amplifier 36 which amplifies the first pulse train and provides it on a line 37 to a first 10 KHz band pass filter (BPF) 38. After filtering it, the first band pass filter 38 provides the first pulse train on a line 40 to a first comparator 42 for comparison with a first reference voltage to ensure that the signal into the electronic key 24 is not merely electromagnetic interference (EMI) or other noise. The first comparator 42 provides the first pulse train on a line 44 to an AND gate 46 where it is ANDed with a second pulse train provided on a line 47 from a 1 MHz oscillator 48. The AND gate 46 provides a modulated first pulse train on a line 49 to a buffer 50 and then back on a line 51 to the capacitive touch button face 22. The BPF 38 stops the modulated first pulse train from going back into the electronic key 24 and distorting its output. The modulated first pulse train is then provided on the line 28 to the capacitive touch button circuit 20. In addition, the modulated first pulse train is provided to the first electronic lock circuit 26 and an optional second electronic lock circuit 32.

In the electronic lock circuit 26, the modulated first pulse train is amplified by a receiving amplifier 52 and provided on a line 53 to a second band pass filter 54 which is a 1 MHz band pass filter. The modulated first pulse train is then provided on a line 56 to a second comparator 58 for comparison with a second reference voltage $V_{ref2}$ to ensure that the first electronic lock 26 is not activated by EMI or other noise. The modulated first pulse train is then provided on a line 60 to an integrator 62. An integrated, modulated first pulse train is provided on a line 64 to an EXCLUSIVE-OR gate 66 where the EXCLUSIVE-OR of the integrated modulated first pulse train and the 10 KHz first pulse signal are provided to reset a counter 68. A 20 KHz clock 70 provides clock pulses on a line 69 to the counter 68. A data signal including pulse to be counted by the counter 68 is provided on the line 73 by AND gate 72 of the 10 KHz first pulse train and the integrated modulated first pulse train. In response to the data signal, the counter 68 counts the number of pulses up to a limit beyond which the output could not be produced due to noise, at which point the output of the counter 68 goes high, yielding an unlock signal on a line 74, and an input bit of an elevator remote station 76. This bit may have many uses, for example, affecting the priority of hall calls and car calls registered by an elevator controller 78. This elevator remote station 76 is substantially shown and described in U.S. Pat. No. 4,622,551 and U.S. Pat. No. 4,497,391. The electronic key input impedance is sufficiently high that the capacitive touch button 20 is not affected by the output of the electronic key. The purpose of the second electronic lock circuit 32 is to allow for a hierarchy of priority hall call or car calls. The second lock circuit 32 has a band pass filter like that for the first electronic lock circuit 26, but for a different frequency which matches a second electronic key using an oscillator like that in the first electronic key but at a different frequency.

FIG. 2 shows the wave forms used and provided by the present invention on a common time line. FIG. 2A shows the 10 KHz first pulse train. FIG. 2B shows the 1 MHz second pulse train. FIG. 2C shows the modified first pulse train. Because of a time delay inherent in the electronic key 24, contact between the electronic key face 34 occurs at a time $T_1$, but modulation does not occur until a time $T_2$. FIG. 2D shows the modulated first pulse train as it emerges from the second comparator 58 on a line 60. FIG. 2E shows the integrated modulated first pulse train provided on line 64. FIG. 2F represents the reset signal found on line 67. FIG. 2G represents the 20 KHz clock signal. FIG. 2H represents the unlock signal provided by the electronic lock 26 on line 74.

Figure 3:
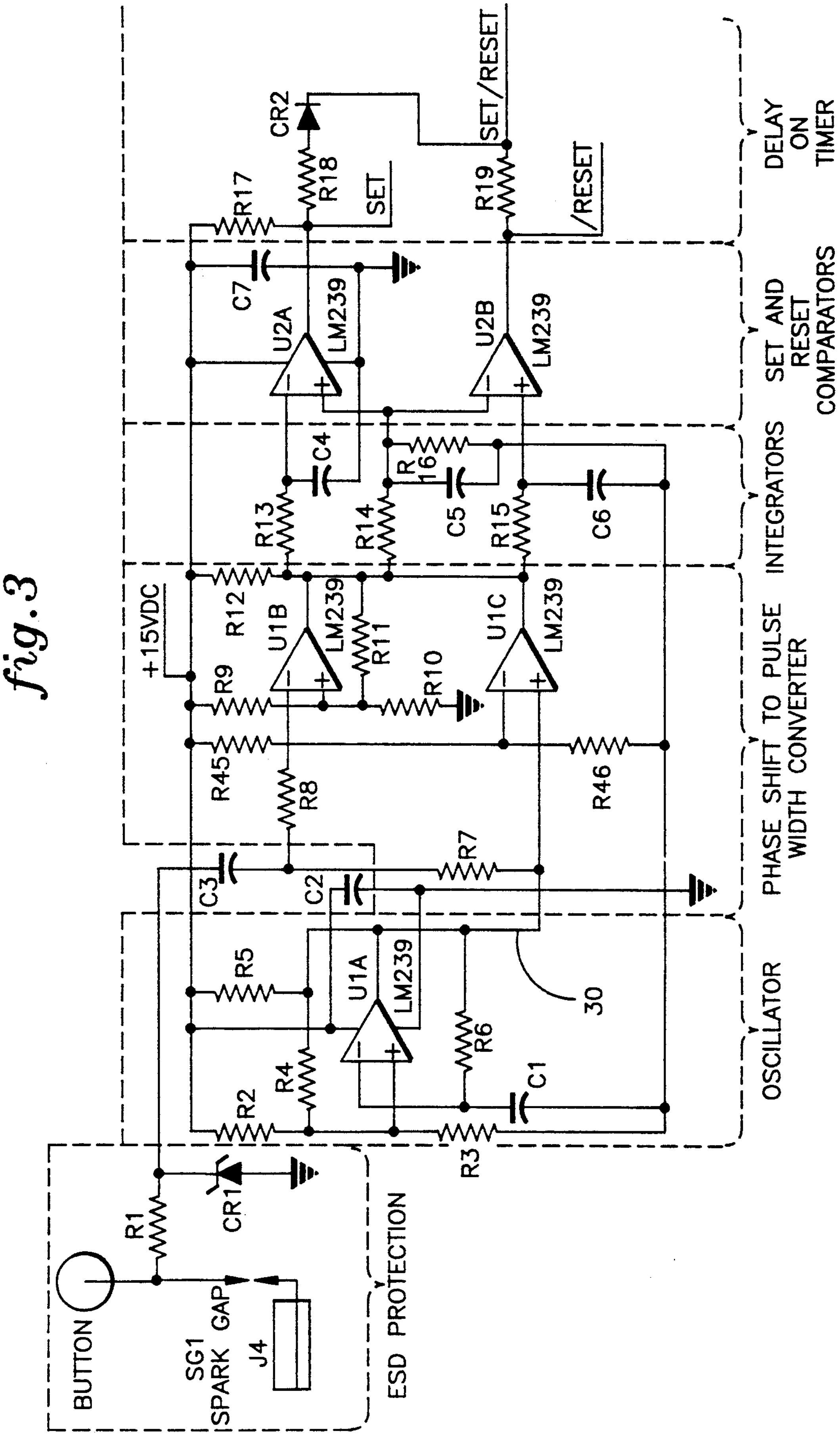
FIG. 3 shows a solid state capacitive touch button circuit.

FIG. 3 shows a solid state touch button circuit with no moving button parts and operated by capacitive sensing by monitoring the phase shift of a signal applied to the face of the button. The solid state button of FIG. 3 can be used as a call button in the car operating panel and/or hall fixtures of an elevator system. The solid state button is capable of capacitively sensing a human touch, preferably providing both visual feedback to the button pusher as well as communication to the operational control of the elevator system through a remote station interface 76 via line 77 (FIG. 1), such as that described in U.S. Pat. No. 4,622,551, "Half-Duplex Industrial Communication System", by Kupersmith et al, and that in U.S. Pat. No. 4,497,391, "Modular Operational Elevator Control System", by Mendelsohn.

If a button touch is constantly maintained, for example, 100 milliseconds, the button will turn on its output long enough to be read by the remote station 76.

The oscillator of FIG. 3 generates a square wave of an appropriate cycle. The cycle is 1/10,000 second. The threshold voltage to the non-inverting input of comparator $U_{1A}$ is set by resistors, $R_2$ and $R_3$, and the state of the output of $U_{1A}$, which controls the hysteresis resistor $R_4$. The "on" state threshold is higher than the "off" state threshold.

The oscillator is controlled by the charging and discharging of capacitor $C_1$. When comparator $U_{1A}$ is in the "on" state, capacitor $C_1$ will charge to the "on" state threshold, and as a result, the comparator will turn off. Conversely, when comparator $U_{1A}$ is in, the "off" state, capacitor $C_1$ will discharge to the "off" state threshold, and as a result, the comparator will turn on.

The phase shift to pulse width converter functions as follows. The oscillator is fed directly into the noninverting input of $U_{1C}$. When the oscillator is high, the output of $U_{1C}$ is released, providing the rising edge of the pulse. The inverting input of $U_{1B}$ monitors the phase shift of the oscillator through resistor $R_7$ across the button impedance.

When the voltage at the inverting input of $U_{1B}$ reaches the threshold voltage on the non-inverting input, the output of $U_{1B}$ is pulled to common, at the falling edge of the pulse.

Capacitor $C_3$ is used to prevent any DC voltage from being placed on the button face. The value of the capacitor $C_3$ should be significantly larger than the capacitive sensitivity to be obtained.

The larger the value of the resistor $R_7$, the larger the phase shift for a given input impedance, including the effects of resistance and noise. The value of the resistor $R_7$ preferably is chosen to generate as large a phase shift as possible from the input.

The integrators convert pulse into a DC voltage. The DC voltage is equal to the duty cycle of the pulse multiplied by $V_{cc}$, the supply voltage.

The pulse from the phase-shift-to-pulse-width-converter is fed into three different R-C integrators. Each integrator has a different time constant, providing relatively slow ($R_{13} \times C_4$) "medium" ($R_{14}//R_{16} \times C_5$) and "fast" ($R_{15} \times C_6$) time constants. The "medium" integrator has a resistor $R_{16}$ in parallel with its capacitor to act as a voltage divider. The voltage divider ensures that the steady state DC voltage of the "medium" integrator will be less than that of the "slow" and "fast" integrators.

The integrators of FIG. 3 provide the auto-balancing feature of the invention. The medium speed integrator provides the trigger signal while the slow and fast integrators provide the set and reset threshold.

The purpose of the set comparator $U_{2A}$ is to provide a set pulse resulting from an increase in the pulse width from the phase-shift-to-pulse-width converter. A set pulse is defined as a continuous release, from common, of the set comparator's output for any duration of time. The set comparator will release its open collector output whenever the DC level of the medium integrator is greater than the DC level of the slow integrator. The purpose of the reset comparator is to provide a reset pulse resulting from a decrease in the phase shift of the pulse-width converter's pulse width. A reset pulse is defined as a continuous pulse common of the reset comparator's output for any duration. The reset comparator will pull its open collector output to common, whenever the DC level of the fast integrator is less than the DC level of the medium integrator.

More than one electronic key, for example, the electronic key 79, may be used, each key having a different modulating signal for making contact with the button face 22 and a circuit with a corresponding electronic lock, for example, the second electronic lock 32, capable of demodulating the first pulse train to a modulated signal and providing an unlock signal.

I claim:

1. A system for providing an unlock signal to an elevator, said system comprising:

(a) a button circuit means including a button face for providing a first pulse train to said button face, and receiving a modulated first pulse train from said button face;

(b) key means for receiving said first pulse train from said button face, modulating said first pulse train for providing said modulated first pulse train to said button face; and (c) lock means for receiving said modulated first pulse train from said button face, demodulating said first pulse train and providing an unlock signal to an elevator remote station which provides hall calls and car calls to an elevator controller.

2. The system of claim 1, wherein said key means includes:

(d) a key face for receiving said first pulse train from said button face when said key face is placed in electrical contact with said button face and a switch has been activated; and (e) a first modulator for modulating said first pulse train with a first modulation signal for providing a modulated first pulse train to said button face.

3. The system of claim 1, wherein said lock means includes:

(f) a demodulator for demodulating said modulated first pulse train thereby providing a demodulated first pulse train signal;

(g) an integrator for integrating said demodulated signal for providing an integral signal;

(h) an AND gate for logically ANDing said integral signal with said first pulse train for providing an AND signal; and (i) a first counter, responsive to said AND signal for counting pulses in said AND signal and providing an unlock signal to an elevator remote station for providing a priority call to said elevator controller.

4. The system of claim 1, further including a plurality of keys for receiving said first pulse train from said button face, each key modulating said first pulse train with a different modulating signal, for providing a plurality of modulated first pulse trains to said button face; and a plurality of locks, one associated with each key for receiving said modulated first pulse train from said button face, each lock demodulating said modulated first pulse train and providing an unlock signal to an elevator remote station which provides hall calls and car calls to an elevator controller.

5. A method for providing a priority call to an elevator controller, comprising the steps of:

(a) electrically connecting a key face to a button face for receiving a first pulse train provided to said button face;

(b) modulating said first pulse train and providing said modulated first pulse train to said button face;

(c) receiving said modulated first pulse train at said button face; and (d) demodulating said modulated first pulse train and providing an unlock signal to an elevator remote station which provides hall calls and car calls to an elevator controller.

6. The method of claim 5, wherein step (e) includes the steps of (f) demodulating said modulated first pulse train, thereby providing a demodulated first pulse train signal;

(g) integrating said demodulated signal for providing an integral signal;

(h) logically ANDing-said integral signal with said first pulse train for providing an AND signal to a first counter; and (i) counting pulses in said AND signal and providing an unlock signal to an elevator remote station for providing a priority call to said elevator controller.

7. The method of claim 5, further including receiving said first pulse train from said button face at a plurality of key faces;

modulating said first pulse train with a different modulating signal for each key face, for providing a plurality of modulated first pulse trains to said button face;

receiving said plurality of modulated first pulse trains from said button face;

demodulating said plurality of modulated first pulse trains and providing a plurality of unlock signals to an elevator remote station which provides hall calls and car calls to an elevator controller.

8. A system for providing a priority call to an elevator, said system comprising:

(a) a button circuit means including a button face for providing a first pulse train to said button face, and receiving a modulated first pulse train from said button face;

(b) key means for receiving said first pulse train from said button face, modulating said first pulse train for providing said modulated first pulse train to said button face; and (c) lock means for receiving said modulated first pulse train from said button face, demodulating said first pulse train and providing an unlock signal to an elevator remote station which provides hall calls and car calls to an elevator controller.

9. The system of claim 1, wherein said button circuit means is a capacitive touch button circuit.

10. The system of claim 8, wherein said button circuit means is a capacitive touch button circuit.

11. The method of claim 5, wherein said button circuit means is a capacitive touch button circuit.

* * * * *